(12) United States Patent
Kredo et al.

(10) Patent No.: US 6,259,771 B1
(45) Date of Patent: Jul. 10, 2001

(54) WEB BASED VOICE RESPONSE SYSTEM

(75) Inventors: Thomas J. Kredo, Rochester; Mike Sutter, Piffard; Stephen Kane, Webster, all of NY (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/054,681

(22) Filed: Apr. 3, 1998

(51) Int. Cl.$^7$ .............................. H04M 1/64; H04M 11/00; G06F 13/00; G06F 17/30
(52) U.S. Cl. .................. 379/88.17; 379/67.1; 379/88.01; 379/88.03; 379/93.23; 709/202; 709/217; 707/513; 707/517
(58) Field of Search .................... 379/67.1, 76, 88.01, 379/88.11, 88.13, 88.17, 93.01, 93.03, 93.09, 93.12, 93.24, 100.05, 100.11, 202, 203, 260, 262, 900, 908; 707/1, 5, 10, 501, 513, 517, 522; 709/227, 228, 229, 202–203, 217–219, 231–236; 704/270, 271, 275

(56) References Cited

U.S. PATENT DOCUMENTS

| | | | | |
|---|---|---|---|---|
| 5,724,412 | * | 3/1998 | Srinivasan | 379/93.23 |
| 5,884,032 | * | 3/1999 | Bateman et al. | 395/200.34 |
| 5,884,262 | * | 3/1999 | Kredo et al. | 704/270 |
| 5,946,684 | * | 8/1999 | Lund | 707/10 |
| 5,978,806 | * | 11/1999 | Lund | 707/10 |
| 5,987,508 | * | 11/1999 | Aaraharam et al. | 709/217 |
| 5,999,965 | * | 12/1999 | Kelly | 709/202 |
| 6,009,469 | * | 12/1999 | Mattaway et al. | 709/227 |

\* cited by examiner

*Primary Examiner*—Allan Hoosain
(74) *Attorney, Agent, or Firm*—Hunton & Williams

(57) ABSTRACT

A telephone announcement system 10 has a URL computer 30 that accesses announcements stored on Internet sites 41–44. Subscribers may enter the sites 41–44 to create or change announcements.

15 Claims, 2 Drawing Sheets

WEB BASED VOICE RESPONSE SYSTEM

FIELD OF THE INVENTION

This invention relates in general to interactive voice response systems and, in particular, to such systems having announcements stored on a web site.

BACKGROUND OF THE INVENTION

Telephone companies have long offered directory assistance service. A typical caller dials a special number, such as "411" for directory assistance. Often the caller who requests assistance is connected to an operator. Recent advances in voice recognition systems permit 411 services to connect the caller to a voice recognition computer. The computer has a store of digital files, including prompts for the caller. In response to information provided by the caller, the voice recognition system either identifies the requested subscriber phone number or passes the call to an operator.

The operator and the voice recognition system have access to one or more computers that store the telephone numbers for local and long-distance subscribers. Subscriber telephone numbers are stored in accordance with subscriber data. Such data includes the name of the subscriber and the subscriber location including street address, city or town, and state. After the 411 service acquires the requested phone number, the number is usually automatically announced to the caller. The announcement is a computer-generated voice signal that gives the caller the requested subscriber phone number. Advances in directory assistance technology allow the directory assistance equipment and its caller to interact. Now a caller can choose to let the directory assistance equipment automatically place the call to the requested phone number. The announcement directs the user to press a specified key on the telephone pad or say "yes" if the user wants the directory assistance equipment to dial the number. Often there is a charge for automatic connection.

Customers of telephone companies may have special announcements associated with directory assistance requests. These special announcements may also include voice recognition and interactive features. For example, when a customer calls a given location, the customer will hear a recording announcing a plurality of options. The customer is directed by the message to select one of the options by pressing a key on the telephone pad. Such announcement systems have certain drawbacks. At present, announcement systems are normally part of the directory assistance equipment. Such equipment normally includes a computer, such as a minicomputer or workstation. The computer itself and its software is both expensive and proprietary. Directory assistance equipment of one manufacturer may not be compatible with equipment of competitors. The equipment is expensive and difficult to reprogram. Subscribers often want to make their own changes to their announcements without depending upon telephone company schedules and personnel. However, subscribers must purchase the equipment and expensive software tools in order to control announcements.

As a result of these problems, there has developed a need for a more flexible telephone announcement system.

SUMMARY OF THE INVENTION

The invention is a telephone announcement system. It includes a switch, a directory assistance subsystem, and a universal resource locator (URL) computer. The switch receives a telephone call from a caller who requests directory assistance, i.e., the telephone number for a subscriber. The directory assistance subsystem has a voice path to the caller through the switch and assumes control of the call from the switch. The directory assistance subsystem is computer-based equipment that includes one or more memories that store and retrieve subscriber phone numbers. The subscriber phone numbers are stored in accordance with subscriber data, such as the subscriber name and address. The URL computer has a control path that is coupled to the directory assistance subsystem for receiving control of the call from the directory assistance subsystem. The URL computer also has a voice path that is coupled through the switch to the caller. The URL computer includes means for identifying the URL associated with the requested number. The means for identifying the URL is a software program that calculates the URL or a database that holds the URLs in accordance with the subscriber phone numbers. Upon generating or retrieving the URL, the URL computer establishes a data path between the URL computer and a subscriber computer located on a network.

In the preferred embodiment, the computer is a subscriber site on the Internet. The Internet site is preferably maintained by the subscriber. At the subscriber site, announcement data is stored in a suitable file format, that is text or digitized speech. Such file formats include hand-held device format language (HDML), as well as WAV files and AIFF files. Once the data path is established to the subscriber site, announcement files from that site are downloaded to the URL computer that converts the files to audio signals. The audio signals are coupled to the call through the switch. The announcements give the caller choices. The caller makes a choice by answering a voice prompt or by pressing a keypad on a dual-tone multi-frequency (DTMF) keypad. Voice or DTMF recognition subsystems in the URL computer convert the user's choice to a signal that is sent via the computer network to the subscriber site. In this manner, the caller and the Internet site may operate interactively until the caller hangs up or makes a final choice. Upon making a final choice, the URL computer and/or the directory assistance subsystem connects the caller to the chosen telephone number.

DETAILED DESCRIPTION

Figure 1:
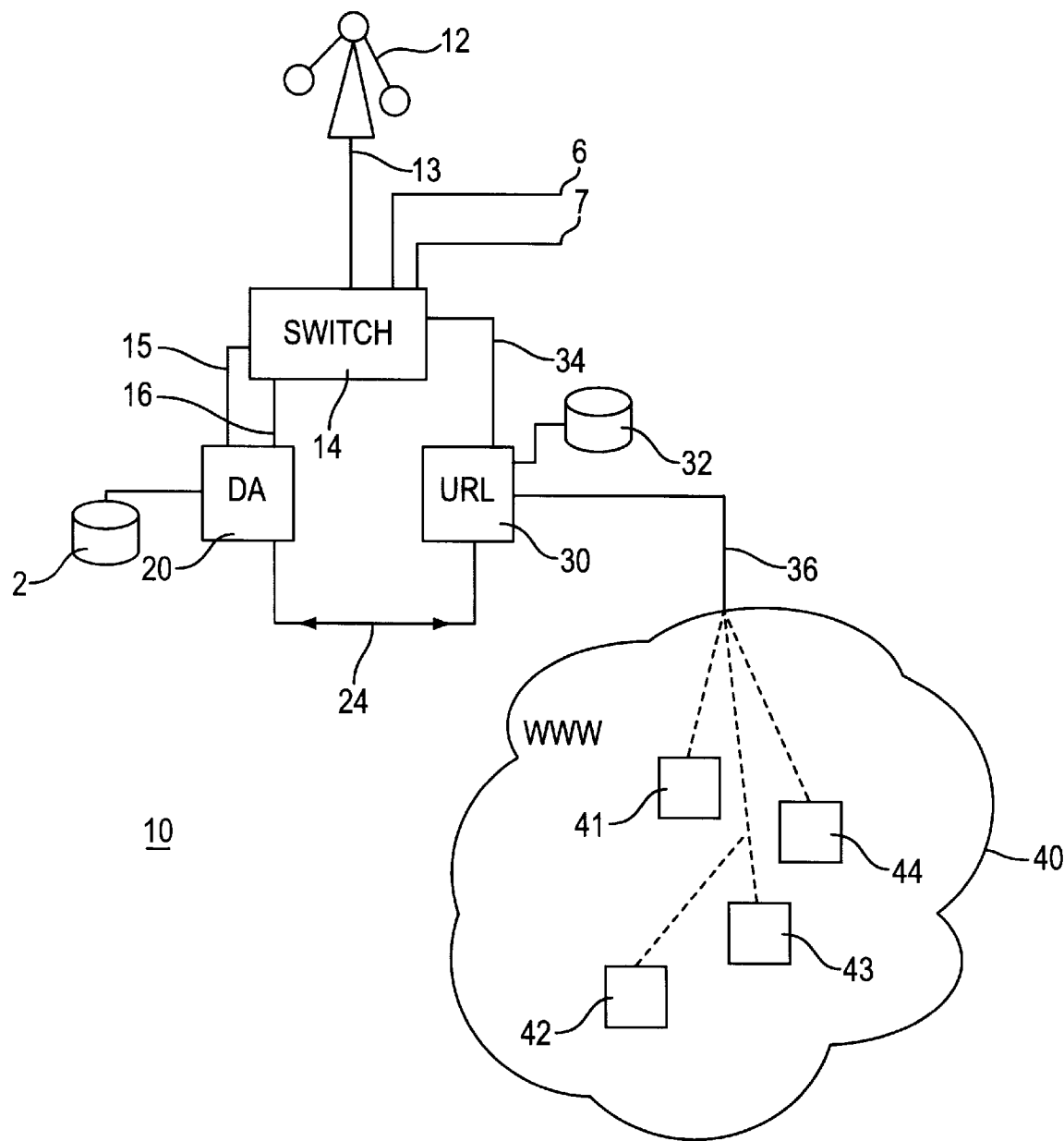
FIG. 1 is a schematic description of the telephone announcement system.

FIG. 1 shows a telephone announcement system 10 that includes a switch 14, a directory assistance subsystem 20 and a URL computer 30. A caller 12 establishes a voice path 13 to the switch 14. The voice path 13 is over a public telephone network (not shown) operated by a telephone company. The "411" on the voice path 13 indicates that the caller is seeking directory assistance. Switch 14 receives the telephone call from caller 12. Switch 14 may receive a number of other telephone calls from other subscriber lines connected to the switch. Switch 14 is controlled to selectively connect incoming calls to one or more outgoing trunk lines such as 6, 7 that lead to the desired subscriber. Directory assistance calls to switch 14 are initially controlled by the directory assistance subsystem 20. Directory assistance subsystem 20 is computer based equipment that includes a memory 22 that stores subscriber telephone numbers. The directory assistance subsystem 20 has a datapath 15 and a voice path 16 connected to the switch 14. The directory assistance subsystem 20 may be operated by an operator or by voice recognition equipment or both. In either case, the caller is asked to identify the desired subscriber. Once identified, the subscriber's number is located in memory 22 by the directory assistance subsystem 20. After the number is located, the directory assistance subsystem 20 passes the located number via a datapath 24 to a universal resource locator (URL) computer 30. URL computer 30 also has a memory 32 and voice path 34 to switch 14. The URL computer 30 may have a program that receives the subscriber phone number via the datapath 24 and calculates a URL corresponding to the phone number. As an alternative, the URL computer 30 may have a database of URLs stored in memory 32. URL computer 30 retrieves the subscriber URL address from the memory 32 and establishes a datapath 36 to a site on an outside computer network 40.

The outside computer network 40 is any suitable computer network and, in particular, is the Internet including the World Wide Web (WWW). On the Internet, there are numerous computers. The URL provided by URL computer memory 32 corresponds to a URL site on one of the computers 41–44. URL computer 30 establishes a datapath 36 to one of the computers 41–44 that corresponds to the subscriber's URL address. The designated URL site downloads announcement data to URL computer 30 via datapath 36. URL computer 30 is equipped with suitable digital-to-analog and text-to-analog conversion devices and/or programs. Those devices and/or programs convert digital announcement data received from the URL computer network 40 to voice signals. The voice signals are then placed on voice path 34 and are heard by the caller 12. The caller 12 may interact one or more times with the subscriber URL site on network 40. The caller interacts by answering voice prompts or pressing one or more DMTF buttons on the caller's telephone pad. When the caller 12 makes a final choice indicating a subscriber telephone number, URL computer 30 hands control of the call back to the directory assistance subsystem 20. The directory assistance subsystem 20 connects the voice path 13 to one of the outgoing trunks 6, 7 which include a further voice path to the subscriber telephone number.

URL computer 30 is coupled to the network 40. The connection via datapath 36 may be made on any suitable line but is preferably over a high-quality digital line that is connected to the Internet such as an ISDN line. Files downloaded from one or more of the URL sites on computers 41–44 are transmitted in HDML or HTML to the URL computer 30. The URL sites 40–44 also contain files stored in WAV format or in AIFF format. URL computer 30 has suitable hardware and software for converting HDML, HTML, WAV and AIFF files to signals. The URL sites 40–44 are maintained by the subscriber. The subscriber can enter those sites by any suitable method and change the announcement data at the subscriber's URL announcement site. Subscribers change data by re-typing the text appearing at the site.

Figure 2:
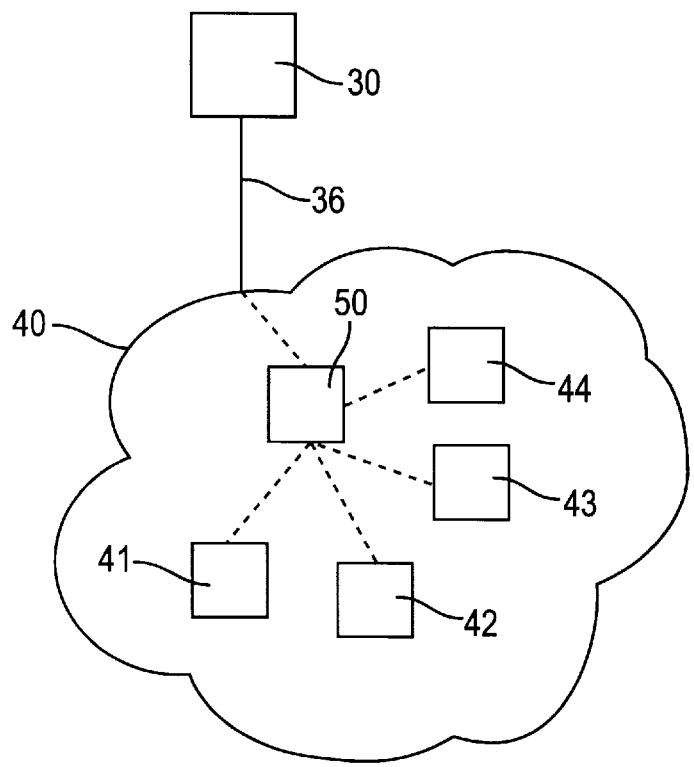
FIG. 2 is a partial schematic diagram of a mirrored site embodiment.

An alternate embodiment of the invention is shown in FIG. 2. There, a mirror web site 50 is connected between the URL computer 30 and to the URL sites 41–44. The mirror computer 50 monitors the URL sites 40–44 and updates its subscriber records that correspond to each of the URL sites. When the URL computer 30 searches the network 40 for one of the URL sites 40–44, the URL computer first connects to the mirror computer 50. Mirror computer 50 generally enhances the response time and speed of the telephone announcement system.

Figure 3:
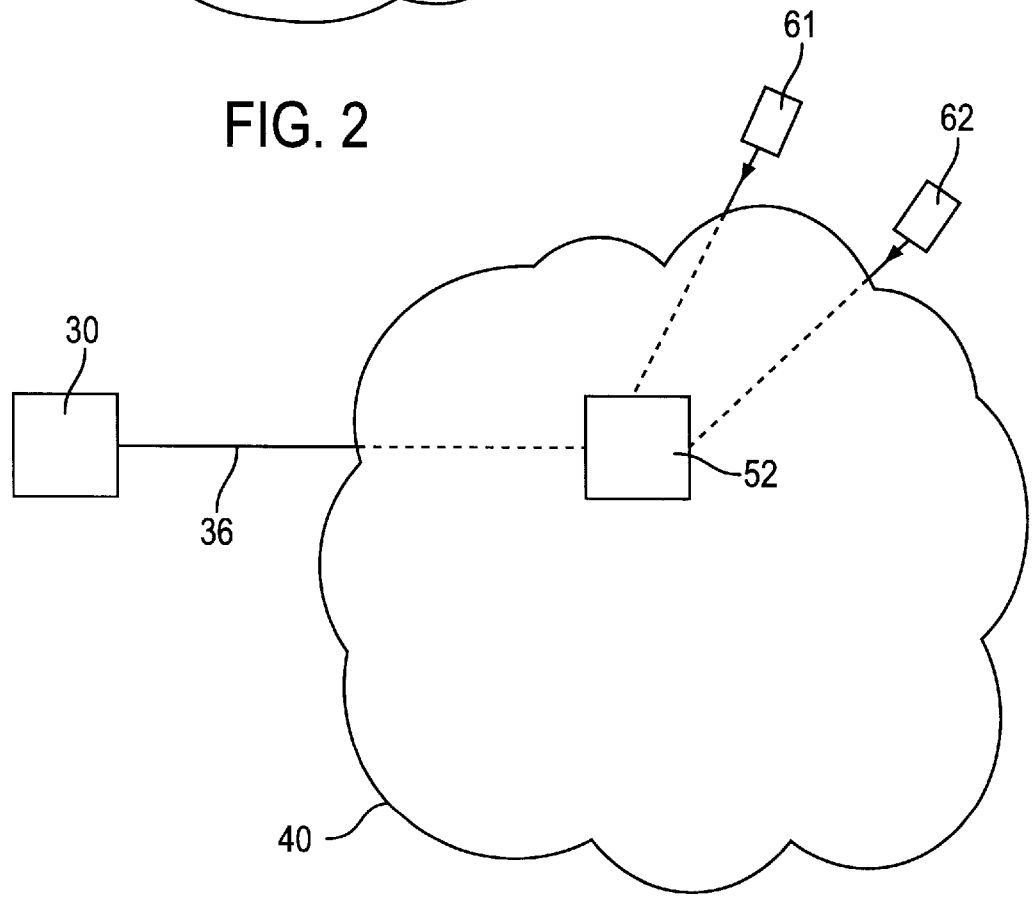
FIG. 3 is a captive site schematic diagram.

A still further embodiment of the invention is shown in FIG. 3. There, a captive web site 52 is shown as part of the Internet 40. The captive web site 52 may be accessed by the subscriber's browser, such as Netscape, Navigator or Microsoft Explorer. Any other suitable browser capable of transmitting and receiving files in HTML format is acceptable. Subscribers 61, 62 may update their files using software that is made available to their browsers, such as Netscape, etc. Subscribers dial the URL for site 52. At site 52, there is sufficient resident code to let the users create and change announcements.

In a typical operation, a caller dials 411. The switch 14 receives the call and the directory assistance subsystem 20 assumes control of the call. Either an operator or voice recognition equipment acquires the desired subscriber phone number and passes that number and control of the call to URL computer 30. URL computer 30 retrieves or calculates the URL corresponding to the subscriber phone number. The URL computer 30 establishes a datapath 36 to the URL site at one of computers 41–44 on Internet 40. Announcement data from the URL site is downloaded to the URL computer 30 which converts that data to audio announcement signals. Voice path 34 couples the announcement audio signals to the caller 12. The caller responds to the audio announcements by making one or more choices. The choices are executed by the caller's voice or by operating one or more DTMF keys on the keypad. After the caller 12 makes the final choice, the call is either disconnected or is connected to the desired subscriber phone number. Connection is made when the URL computer 30 hands control of the call back to the directory assistance subsystem 20. The directory assistance subsystem 20 receives the desired subscriber phone number. Then the directory assistance subsystem 20 selectively connects the call on voice path 13 to one of the trunk lines 6, 7 to establish a voice path to the subscriber.

Having thus described the general embodiments of the invention, those skilled in the art will appreciate that further changes, additions, alterations and deletions may be made to the embodiments without departing from the spirit and the scope of the invention as set forth in the following claims. Those skilled in the art understand that the switch 14, the directory assistance apparatus 15 are found in existing equipment such as the DMS 100/200 and the D1 Directory Assistance Service manufactured by Northern Telecom.

What is claimed:

1. A telephone announcement system, comprising:
   a directory assistance apparatus, responsive to a call from a caller identifying subscriber data, for controlling the call, said directory assistance apparatus having a memory for storing at least one subscriber phone number corresponding to the subscriber data; and
   a computer having a control path coupled to the directory assistance apparatus and being responsive to the subscriber phone number, for assuming control of the call from the directory assistance apparatus, the computer including means for identifying a universal resource locator (URL) associated with the subscriber phone number, the computer further including means for establishing a data path between the computer and a URL site corresponding to the identified URL for downloading announcement data from the URL site, said announcement data comprising files stored in a format selected from the group consisting of Handheld Device Markup Language, WAV file format, and AIFF or Hyper-Text Markup Language.

2. The telephone announcement system of claim 1, wherein the computer further comprises means for transferring control of the call to the URL site associated with the subscriber phone number.

3. The telephone announcement system of claim 1 wherein the subscriber data comprises subscriber names and subscriber addresses.

4. The telephone announcement system of claim 1 wherein the means for identifying a URL is a memory of universal resource locators stored by phone numbers.

5. The telephone announcement system of claim 1 wherein the means for identifying a URL is a computer program for calculating the URL of a phone number.

6. The telephone announcement system of claim 1, wherein said URL site comprises a computer network sire for storing announcement data corresponding to the subscriber phone numbers and for generating audio signals corresponding to the announcement data.

7. The telephone announcement system of claim 1, wherein the computer further comprises a digital-to-analog to text-to-analog converter for generating audio signals from data downloaded from the URL site and is configured for coupling the audio signals to the caller so that the caller receives announcements.

8. The directory assistance apparatus of claim 1, wherein an announcement gives the caller one or more choices and the URL accesses further announcements in accordance with choices made by the caller.

9. The directory assistance apparatus of claim 1 wherein the computer is connected to a computer packet network.

10. The directory assistance apparatus of claim 9 wherein the computer is connected to another computer in the computer packet network, said other computer comprising a mirrored site of URLs located on the computer packet network.

11. The directory assistance apparatus of claim 9 wherein the announcements at the URLs are accessed though the computer packet network and changed.

12. A method for making telephone announcements, comprising:

receiving a telephone call from a caller requesting directory assistance for a subscriber phone number;

establishing a voice path to the caller;

selectively routing the call to directory assistance equipment;

establishing a voice path between the directory assistance equipment and the caller;

generating a subscriber phone number in accordance with subscriber data provided by the caller;

generating a universal resource locator (URL) associated with the generated subscriber (callee) phone number, said URL corresponding to a URL site;

downloading from the URL site data corresponding to announcements of the subscriber, said data comprising files stored in a format selected from the group consisting of Handheld Device Markup Language, WAV file format, and AIFF or Hyper-Text Markup Language;

converting the data downloaded from the URL site to audio announcement signals; and establishing a voice path between a computer and said URL site for transmitting the audio announcement signals to the caller.

13. The method of claim 12 comprising the further step of changing the announcement data at the URL site.

14. The method of claim 12 comprising the further step of mirroring announcement data at the URL site and downloading mirrored announcement data.

15. The method of claim 12 wherein the downloaded data includes choices and the caller makes one or more choices given in the audio announcement signals.

* * * * *